US009424002B2

(12) United States Patent
Bruno et al.

(10) Patent No.: US 9,424,002 B2
(45) Date of Patent: Aug. 23, 2016

(54) META-APPLICATION FRAMEWORK

(75) Inventors: John Bruno, Snoqualmie, WA (US); Viswanath Vadlamani, Sammamish, WA (US); Steve C. Tullis, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 303 days.

(21) Appl. No.: 12/960,327

(22) Filed: Dec. 3, 2010

(65) Prior Publication Data

US 2012/0143898 A1    Jun. 7, 2012

(51) Int. Cl.
*G06F 17/30* (2006.01)
*G06F 9/44* (2006.01)

(52) U.S. Cl.
CPC ............ *G06F 8/30* (2013.01); *G06F 17/30395* (2013.01)

(58) Field of Classification Search
None
See application file for complete search history.

(56) References Cited

U.S. PATENT DOCUMENTS

| | | | |
|---|---|---|---|
| 5,579,509 A | 11/1996 | Furtney et al. | |
| 5,758,154 A | 5/1998 | Qureshi | |
| 5,890,175 A | 3/1999 | Wong et al. | |
| 6,012,053 A | 1/2000 | Pant et al. | |
| 6,167,441 A | 12/2000 | Himmel | |
| 6,178,511 B1 | 1/2001 | Cohen et al. | |
| 6,347,398 B1 | 2/2002 | Parthasarathy et al. | |
| 6,374,102 B1 | 4/2002 | Brachman et al. | |
| 6,453,361 B1 | 9/2002 | Morris | |
| 6,523,166 B1 | 2/2003 | Mishra et al. | |
| 6,754,470 B2 | 6/2004 | Hendrickson et al. | |
| 7,016,919 B2 | 3/2006 | Cotton et al. | |
| 7,100,195 B1 | 8/2006 | Underwood | |
| 7,158,943 B2 | 1/2007 | van der Riet | |
| 7,158,966 B2 | 1/2007 | Brill et al. | |
| 7,240,055 B2 | 7/2007 | Grasso et al. | |
| 7,257,583 B2 | 8/2007 | Hofmeister et al. | |
| 7,537,158 B1 | 5/2009 | Cox et al. | |
| 7,548,949 B2 | 6/2009 | Anderson | |
| 7,599,901 B2 | 10/2009 | Mital et al. | |
| 7,599,918 B2 | 10/2009 | Shen et al. | |
| 7,698,327 B2 | 4/2010 | Kapur | |

(Continued)

OTHER PUBLICATIONS

Aktas, et al., "XML Metadata Services", retrieved on Jul. 12, 2010 at <<http://citeseerx.ist.psu.edu/viewdoc/download?doi=10.1.1.69.2190&rep=rep1&type=pdf>>, Proceedings of International Conference on Semantics, Knowledge and Grid (SKG), Guilin, CN, Nov. 2006, pp. 1-24.

(Continued)

*Primary Examiner* — Miranda Huang
(74) *Attorney, Agent, or Firm* — Steve Wight; Sandy Swain; Micky Minhas

(57) ABSTRACT

The present disclosure describes a meta-application framework that enables data to be associated with a class of applications called a meta-application. A meta-application entity may store attributes in common across multiple platforms. A platform entity may store attributes in common across multiple devices and/or operating systems. A device entity may be comprised by a particular set of hardware features and an operating system entity may be comprised of a particular set of software feature. Data associated with the meta-application framework may be accessed directly via data manipulation operations or alternatively by application operations via an application programming interface or via the aforementioned data manipulation operations. Applications may then identify application specific behavior at the appropriate level of detail.

20 Claims, 6 Drawing Sheets

(56) References Cited

U.S. PATENT DOCUMENTS

| | | | |
|---|---|---|---|
| 7,716,225 B1 | 5/2010 | Dean et al. | |
| 7,739,690 B2 | 6/2010 | Sedukhin et al. | |
| 7,779,064 B2 | 8/2010 | Phillips | |
| 7,783,729 B1 | 8/2010 | Macaluso | |
| 8,260,736 B1* | 9/2012 | Lear | G06N 5/02 706/46 |
| 8,478,812 B2 | 7/2013 | Oliver et al. | |
| 8,635,204 B1 | 1/2014 | Xie et al. | |
| 8,650,543 B1 | 2/2014 | Winch | |
| 8,713,560 B2 | 4/2014 | Neumann et al. | |
| 8,930,939 B2 | 1/2015 | Kline et al. | |
| 2001/0047363 A1 | 11/2001 | Peng | |
| 2003/0191737 A1 | 10/2003 | Steele et al. | |
| 2004/0034853 A1* | 2/2004 | Gibbons et al. | 717/174 |
| 2004/0043763 A1* | 3/2004 | Minear et al. | 455/419 |
| 2005/0070259 A1 | 3/2005 | Kloba et al. | |
| 2005/0102215 A1 | 5/2005 | Ausubel et al. | |
| 2005/0120113 A1 | 6/2005 | Bunch et al. | |
| 2005/0191737 A1 | 9/2005 | Iwamoto et al. | |
| 2006/0036510 A1 | 2/2006 | Westphal et al. | |
| 2006/0067244 A1 | 3/2006 | Sekaran et al. | |
| 2006/0136389 A1 | 6/2006 | Cover et al. | |
| 2006/0155672 A1 | 7/2006 | Lee et al. | |
| 2006/0161520 A1 | 7/2006 | Brewer et al. | |
| 2006/0259964 A1 | 11/2006 | Maldonado et al. | |
| 2007/0028266 A1 | 2/2007 | Trajkovic et al. | |
| 2007/0061242 A1 | 3/2007 | Ramer et al. | |
| 2007/0073717 A1 | 3/2007 | Ramer et al. | |
| 2007/0179863 A1 | 8/2007 | Stoll | |
| 2007/0266305 A1 | 11/2007 | Cong et al. | |
| 2007/0294240 A1 | 12/2007 | Steele et al. | |
| 2008/0207182 A1 | 8/2008 | Maharajh et al. | |
| 2008/0228503 A1 | 9/2008 | Buchheit | |
| 2008/0235179 A1 | 9/2008 | Kurien et al. | |
| 2008/0307047 A1 | 12/2008 | Jowett et al. | |
| 2009/0171721 A1 | 7/2009 | LeBaron et al. | |
| 2009/0216609 A1 | 8/2009 | Westphal | |
| 2009/0222842 A1* | 9/2009 | Narayanan | G06F 9/542 719/328 |
| 2009/0228439 A1 | 9/2009 | Manolescu et al. | |
| 2009/0240586 A1 | 9/2009 | Ramer et al. | |
| 2009/0247078 A1 | 10/2009 | Sklovsky et al. | |
| 2010/0003923 A1 | 1/2010 | McKerlich et al. | |
| 2010/0010994 A1 | 1/2010 | Wittig et al. | |
| 2010/0017392 A1 | 1/2010 | Dian | |
| 2010/0100839 A1 | 4/2010 | Tseng et al. | |
| 2010/0124911 A1 | 5/2010 | Leeder | |
| 2010/0145978 A1* | 6/2010 | Anashkin et al. | 707/769 |
| 2010/0233996 A1* | 9/2010 | Herz | H04L 63/08 455/411 |
| 2010/0306191 A1 | 12/2010 | LeBeau et al. | |
| 2011/0047594 A1 | 2/2011 | Mahaffey et al. | |
| 2011/0119287 A1 | 5/2011 | Chen et al. | |
| 2011/0161912 A1* | 6/2011 | Eteminan et al. | 717/101 |
| 2011/0209143 A1 | 8/2011 | Ierullo | |
| 2011/0276598 A1 | 11/2011 | Kozempel | |
| 2011/0289015 A1 | 11/2011 | Mei et al. | |
| 2011/0314004 A1 | 12/2011 | Mehta | |
| 2012/0053829 A1 | 3/2012 | Agarwal et al. | |
| 2012/0054167 A1 | 3/2012 | Chi et al. | |
| 2012/0240236 A1 | 9/2012 | Wyatt et al. | |
| 2012/0284256 A1 | 11/2012 | Mahajan et al. | |
| 2014/0007057 A1 | 1/2014 | Gill et al. | |
| 2014/0114901 A1 | 4/2014 | Pradhan et al. | |
| 2014/0149399 A1 | 5/2014 | Kurzion | |
| 2014/0250098 A1 | 9/2014 | Kasterstein et al. | |

OTHER PUBLICATIONS

Bode, "Apple Hits Users With Behavioral Ads: Changes privacy policy, offers new opt-out option", retrieved on Aug. 11, 2010 at <<http://www.dslreports.com/shownews/Apple-Hits-Users-With-Behavioral-Ads-109005>>, dslreports.com, Broadband, Jun. 22 2010, pp. 1-15.

Cheng, "Google's new behavioral ads already raising privacy worries", retrieved on Aug. 11, 2010 at <<http://arstechnica.com/web/news/2009/03/googles-interest-based-ads-try-to-address-privacy-worries.ars>>, Conde Nast Digital, Ars Technica, Mar. 11 2009, pp. 1-2.

Edwards, "Carriers missing opportunity with app stores", retrieved on Jul. 6, 2010 at <<http://www.mobilecommercedaily.com/carriers-missing-opportunity-with-app-stores/>>, Mobile Commerce Daily, Jun. 14, 2010, pp. 1-3.

Kats, "Ace Marketing, Blue Bite to launch proximity marketing network—news briefs", retrieved on Jul. 6, 2010 at <<http://www.mobilecommercedaily.com/today-in-mobile-commerce-news-briefs-2/>>, Mobile Commerce Daily, Apr. 2, 2010, pp. 1-2.

Linthicum, "Mercator / Next Generation Application Integration, From Information, to Process, to Services", retrieved on Jul. 12, 2010 at <<http://bukovec.fei.tuke.sk/predmety/pdt/referaty/EnterpriseApplicationIntegration/Steller/zad1/wp_next_gen_app_integration.pdf>>, Mercator Software, Wilton, CT, Oct. 2001, pp. 1-18.

Mondok, "Microsoft behavioral advertising technology goes global", retrieved on Aug. 11, 2010 at <<http://arstechnica.com/microsoft/news/2006/12/6414.ars>>, Conde Nast Digital, Ars Technica, Dec. 28, 2006, pp. 1.

O'Connor, et al., "PolyLens: A Recommender System for Groups of Users", retrieved on Aug. 11, 2010 at <<http://www.grouplens.org/papers/pdf/poly-camera-final.pdf>>, Kluwer Academic Publishers, Proceedings of European Conference on Computer Supported Cooperative Work (ECSCW), 2001, pp. 199-218.

"Openwave Mobile Analytics suggests new revenue opportunities for operators", retrieved on Jul. 6, 2010 at <<http://www.telecoms.com/18260/openwave-mobile-analytics-suggests-new-revenue-opportunities-for-operators/>>, Telecoms.com, Mobile World Congress, Barcelona, Feb. 16, 2010, pp. 1-6.

Perez, "Mobile Cloud Computing: $9.5 Billion by 2014", retrieved on Jul. 6, 2010 at <<http://www.readwriteweb.com/archives/mobile_cloud_computing_95_billion_by_2014.php>>, ReadWriteWeb, Feb. 23, 2010, pp. 1-4.

U.S. Appl. No. 12/960,263, filed Dec. 3, 2010, Bruno et al., "Improving Discoverability Using Behavioral Data".

U.S. Appl. No. 12/960,267, filed Dec. 3, 2010, Zargahi et al., "Using Behavioral Data to Manage Computer Services".

Vax, "Inside the App Store: The New Marketplace for Digital Goods", retrieved on Jul. 6, 2010 at <<http://www.getelastic.com/app-stores/>>, Elastic Path, Mar. 4, 2010, pp. 1-7.

Webster. "Amazon Throws Hat into Android App Store Ring", retrieved on Oct. 1, 2010 at <<http://www.cnet.com/8301-19736_1-20018078-251.html>>, CNET.com, Sep. 29, 2010, 2 pages.

Office action for U.S. Appl. No. 12/960,263, mailed on Jan. 31, 2013,Bruno Jr. et al., "Improving Discoverability Using Behavioral Data", 17 pages.

Office action for U.S. Appl. No. 12/960,267, mailed on Jan. 31, 2013, Zargahi et al., "Using Behavioral Data to Manage Computer Services", 18 pages.

Office action for U.S. Appl. No. 12/960,263, mailed on Jun. 11, 2013, Bruno Jr. et al., "Improving Discoverability Using Behavioral Data", 20 pages.

Office action for U.S. Appl. No. 12/960,267, mailed on Jun. 11, 2013, Zargahi et al., "Using Behavioral Data to Manage Computer Services", 23 pages.

Office Action for U.S. Appl. No. 12/960,267, mailed on Sep. 18, 2014, Kamran Rajabi Zargahi, "Using Behavioral Data to Manage Computer Services", 21 pages.

Office action for U.S. Appl. No. 12/960,263, mailed on Sep. 9, 2014,Bruno Jr. et al., "Improving Discoverability Using Behavioral Data", 21 pages.

"Application Compatibility Analyzer 1.0", Microsoft.com, retrieved on Jul. 2, 2015, available at <<https://www.microsoft.com/en-us/download/details.aspx?id=20398>>, 3 pages.

Constantinou, "Mobile App Stores: The Next Two Years", Retrieved on Jul. 16, 2010 at <<http://www.visionmobile.com/blog/2009/10/mobile-app-stores-the-next-two-years/>>, Visionmobile, Oct. 30, 2009, pp. 1-15.

(56) References Cited

OTHER PUBLICATIONS

Essany, "Google Puts App Store Links in Mobile Search Results", Retrieved on Jul. 16, 2010 at <<http://www.mobilemarketingwatch.com/google-puts-app-store-links-in-mobile-search-results-7190/>>, Mobile Marketing Watch, May 3, 2010, pp. 1-7.
Freeman, "Information is Everywhere Managing Information for Discovery and Search", Retrieved on Jul. 15, 2010 at <<http://www.dexmar.com/website/dexcom4.nsf/c2f7f2b8d369f55b8025684d00603bab/9cb30babeb66fd4b802571650025d96e/$FILE/IBM%20Search%20and%20Discovery.ppt>>, IBM Software Group, May 2006, pp. 1-46.
Garimella, "Understanding the Application Compatibility in Your Environment", retrieved on Jun. 29, 2015, available at <<https://technet.microsoft.com/en-us/library/ee449434(v=ws.10).aspx>>, Feb. 20, 2011, 3 pages.
Grove, "Read or Update a Registry Key for All Users on a System", Mick's Mix, Jan. 13, 2012, 3 pages.
IBM.com, "Using the Lotus Notes Single User to Multi-User Migration Assistant (MUMA) Tool", retrieved on Jul. 3, 2015, available at <<http://www-01.ibm.com/support/docview.wss?uid=swg21459627>>, Oct. 4, 2011, 5 pages.
Khnaser, "Cool, Free Virtualization Tool: Microsoft's RDS Application Compatibility Analyzer", available at: <<https://virtualizationreview.com/blogs/virtual-insider/2011/05/free-microsoft-rds-application-compatibility-analyzer.aspx>>, May 31, 2011, 4 pages.
Liang, "Inventory software with Microsoft's Application Compatibility Analyzer", available at <<http://www.techrepublic.com/article/inventory-software-with-microsofts-application-compatibility-analyzer/>>, Jun. 30, 2003, 14 pages.
Madden, "How Applications use the Registry in Terminal Server Environments", retrieved on Jul. 3, 2015, available at <<http://www.brianmadden.com/blogs/brianmadden/archive/2004/08/03/how-applications-use-the-registry-in-terminal-server-environments-part-2-of-3.aspx>>, Aug. 3, 2015, 8 pages.
Marl, "User Data and Settings Management", retrieved on Jul. 3, 2015, available at <<https://technet.microsoft.com/en-us/library/bb490855.aspx>>, Aug. 1, 2001, 22 pages.
Microsoft.com, "Managing Default Applications", retrieved on Jul. 3, 2015, available at <<https://msdn.microsoft.com/en-us/library/windows/desktop/cc144160(v=vs.85).aspx>>, Mar. 25, 2013, 6 pages.
Microsoft.com, "Registry Hives", retrieved on Jul. 3, 2015, available at <<https://msdn.microsoft.com/en-us/library/windows/desktop/ms724877(v=vs.85).aspx>>, Oct. 2, 2011, 2 pages.
Microsoft.com, "Run and RunOnce Registry Keys", retrieved on Jul. 3, 2015, available at <<https://msdn.microsoft.com/en-usilibrary/aa376977(v=vs.85).aspx>>, Jun. 29, 2015, 2 pages.
Microsoft.com, "Windows Registry Information for Advanced Users", retrieved on Jul. 3, 2015, available at <<https://support.microsoft.com/en-us/kb/256986>>, May 12, 2015, 13 pages.
Miyamura, "What Drives iTunes App Store Search Rankings?", Retrieved on Jul. 16, 2010 at <<http://www.appsasabiz.com/2010/02/03/what-drives-itunes-app-store-search-rankings/>>, apps as a biz, Feb. 3, 2010, pp. 1-6.
Office action for U.S. Appl. No. 12/944,899, mailed on Oct. 23, 2014, Steven Charles Tullis, "Unified Application Discovery across Application Stores", 25 Pages.
Office action for U.S. Appl. No. 12/945,061, mailed on Nov. 23, 2012, Macbeth et al., "Rich Search Over and Deep Integration with Applications", 25 pages.
Office action for U.S. Appl. No. 12/945,207, mailed on Dec. 12, 2012, Macbeth et al., "Application Transfer Protocol", 19 pages.
Office action for U.S. Appl. No. 12/945,061, mailed on Dec. 12, 2014, Macbeth et al., "Rich Search Over and Deep Integration with Applications", 17 pages.
Office action for U.S. Appl. No. 12/944,899, mailed on Dec. 13, 2012, Tullis et al., "Unified Application Discovery across Application Stores", 24 pages.
Office action for U.S. Appl. No. 12/945,207, mailed on Dec. 3, 2015, Macbeth et al., "Application Transfer Protocol", 25 pages.
Office action for U.S. Appl. No. 12/944,899, mailed on Dec. 4, 2015, Tullis et al., "Unified Application Discovery across Application Stores", 23 pages.
Office action for U.S. Appl. No. 12/945,207, mailed on Feb. 12, 2015, Macbeth et al., "Application Transfer Protocol", 26 pages.
Office action for U.S. Appl. No. 12/944,899, mailed on Mar. 15, 2012, Steven Charles Tullis et al., "Unified Application Discovery across Application Stores", 23 pages.
Office action for U.S. Appl. No. 12/960,267, mailed on Apr. 17, 2015, Zargahi et al., "Using Behavioral Data to Manage Computer Services", 25 pages.
Office action for U.S. Appl. No. 12/945,061, mailed on May 10, 2012, Macbeth et al.,"Rich Search Over and Deep Integration with Applications," 19 pages.
Office action for U.S. Appl. No. 12/945,061, mailed on May 20, 2014, Macbeth et al., "Rich Search Over and Deep Integration with Applications", 14 pages.
Office action for U.S. Appl. No. 12/944,899, mailed on May 21, 2015, Tullis et al., "Unified Application Discovery across Application Stores", 20 pages.
Office action for U.S. Appl. No. 12/945,207, mailed on Jun. 26, 2012, Macbeth et al., "Application Transfer Protocol", 18 pages.
Office action for U.S. Appl. No. 12/944,899, mailed on Jul. 9, 2013, Steven Charles Tullis et al., "Unified Application Discovery across Application Stores", 26 pages.
Office action for U.S. Appl. No. 12/945,207, mailed on Aug. 12, 2014, Macbeth et al., "Application Transfer Protocol", 22 pages.
Office action for U.S. Appl. No. 12/945,061 mailed on Sep. 9, 2015, Rucker et al., "Rich Search Over and Deep Integration with Applications", x pages.
Sims, "Flow to Detect RDS-Specific Application Compatibility Issues by Using the RDS Application Compatibility Analyzer", available at <<http://2x.helpserve.com/knowledgebase/article/View/84/0/how-to-detect-rds-specific-application-compatibility-issues-by-using-the-rds-application-compatibility-analyzer, Feb. 12, 2010, 2 pages.
"The Windows NT Registry Database", retrieved on Jul. 3, 2015, available at <<http://scilnet.fortlewis.edu/tech/NT-Server/registry.htm>>, Mar. 7, 2001, 4 pages.
Webster, "Amazon Throws Flat Into Android App Store Ring" Retrieved on Oct. 1, 2010 at <<http://www.cnet.com/8301-19736_1-20018078-251.html>>, CNet, Sep. 29, 2010, 2 pgs.
Bartz, et al., "Finding Similar Failures Using Callstack Similarity", USENIX Association, In the Proceedings of the Third conference on Tackling Computer Systems Problems With Machine Learning Techniques, Dec. 2008, pp. 1-13.
Citrix.com, "Exploring Application compatibility methods", White Paper, available at <<https://www.citrix.com/content/dam/citrix/en_us/documents/products-solutions/exploring-application-compatibility-methods.pdf>>, Jun. 2015, 11 pages.
Office action for U.S. Appl. No. 12/945,061, mailed on Feb. 2, 2016, MacBeth et al., "Rich Search Over and Deep Integration with Applications", 17 pages.
Office action for U.S. Appl. No. 12/960,267, mailed on Feb. 2, 2016, Zargahi et al., "Using Behavioral Data to Manage Computer Services", 27 pages.

\* cited by examiner

META-APPLICATION FRAMEWORK

BACKGROUND

Software application users conceive of applications differently from application developers. Application users often prefer to think of applications as bundles of functionality independent of implementation details. Diametrically opposed to application users are software application developers who by definition are steeped in implementation details. However, with the proliferation of client devices, application users presently track application behavior specific not only to a particular device, but to a particular set of hardware features comprising a device. With the proliferation of operating systems and operating system versions, application users also presently track their particular set of software features comprising their operating system.

Vendors have attempted to simplify this state of affairs by defining a notion of a platform. A platform is a family of devices and/or operating systems with features in common. As an example, a vendor may sell the same mobile phone in two versions, the first with a slide-out keyboard, and the second with a virtual keyboard on a touch-screen. The two versions of the mobile phone might have the same operating system. While the two versions might be considered the same platform, an application might run differently on the two phones depending on keyboard type. Similarly, two devices from the same vendor, with exactly the same hardware features might have different service packs of the same operating system. Despite the potential for different application behavior on the basis of the service packs, the two devices would still be considered the same platform. Accordingly, application users have come to abstract away implementation details by associating applications with a particular platform.

It is not unusual for a user to run the same software on different platforms. For example, a user might have a home personal computer (PC) running one operating system, and a work PC running another operating system. The same person might possess a cell phone running a third operating system and a pad device running a fourth operating system. This same user may wish to view the same document on any of these client devices, and because of the differing form factors and operating systems, the user experience may widely vary.

An example of how user experience can vary widely across multiple platforms despite nominally running the same application is a user that wishes to view a Microsoft Word™ 2003 document. The user may have originally authored the document on a work PC running Microsoft Word™ 2003 on the Microsoft XP™ operating system. The user may have distributed the document and then received revisions from a coworker in email. If the user was in transit, the user might look at the document on his smart phone running Word Mobile™. In all three examples, the user is reviewing the same content, all on some form of Microsoft Word™, but having different user experience quality due to the different client devices, and operating system versions.

In the case of mobile devices, it is typical for the same version of the same application to be running on slightly different devices. For example, the same application may run on two mobile phones, both with the same operating system, yet because the first phone has a slide-out keyboard but the second phone relies on a virtual keyboard on a touch-screen, the user experience is different. By way of another example, the same application may run on two phones, both with the same make, model and feature set. However, while the application runs full featured on the first phone since it has version 2 of an operating system, the application may run in compatibility mode with a partial feature on the second phone since it has version 1 of the operating system.

Because there is no existing framework to associate data with a class of applications at differing levels of implementation detail, user ratings of an application that vary according to device or operating system will yield misleading results when aggregated by platform. For example an application may receive high rankings from users running devices with slide-out keyboards but low rankings from users running devices with virtual keyboards. Without a framework to associate data with a class of applications at differing levels of detail application users presently track implementation details and application developers presently tolerate customer feedback aggregated at differing, and potentially inappropriate levels of implementation detail.

SUMMARY

This Summary is provided to introduce simplified concepts for improving discoverability using behavioral data, which are further described below in the Detailed Description. This Summary is not intended to identify essential features of the claimed subject matter, nor is it intended for use in determining the scope of the claimed subject matter.

This application relates to implementation of a meta-application framework. The meta-application framework provides for the storage and retrieval of software application data and meta-application data. Because software applications may be related to their respective meta-applications, in some contexts, end users and computer applications may retrieve information not only for a software application, but also retrieve information for other software applications that relate to the first software application by being associated with a related meta-application.

One example context is an end user querying an application store to search for applications that have desirable characteristics across a number of different platforms, for instance a text editor that works equally well with mobiles phones with slide-out keyboards and those without. The meta-application framework may store application and meta-application data beyond physical characteristics of platforms or feature sets of applications. Another example context is where the meta-application framework is associated with behavioral data and behavioral statistics of users. Because behavioral data extends beyond a single platform or a single application, behavioral data may be associated with meta-applications. In this context, an application's store may identify the present end user, search the meta-application framework for software applications that have similar behavioral data, and proactively display the query results.

As a data storage and retrieval facility, the meta-application framework may include a meta-application schema, user and/or programmatic interfaces to the meta-application schema and components to apply logic to data organized in the meta-application schema. Components applied to the meta-application schema may include a query component, a directory services engine and a behavioral analysis engine. Such components may be applied to additional data external to data stored according to the meta-application schema.

An exemplary meta-application schema enables the association of data with a class of applications, called a meta-application. The meta-application may be associated with a platform. A platform may be associated with a device and/or an operating system. A platform stores attributes common to a family of devices and/or operating systems. A device may comprise a set of hardware features, and an operating system may comprise a set of software features.

Example methods utilizing the meta-application schema include, but are not limited to performing direct data manipulation operations on a data store according to the meta-application schema. Data manipulation operations may include record creation, retrieval, update and deletion operations. Alternatively, example methods utilizing the meta-application schema may include applications operating on the data store according to the meta-application schema, via an application programming interface (API) or via the aforementioned direct data manipulation methods.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

Overview

Figure 1:
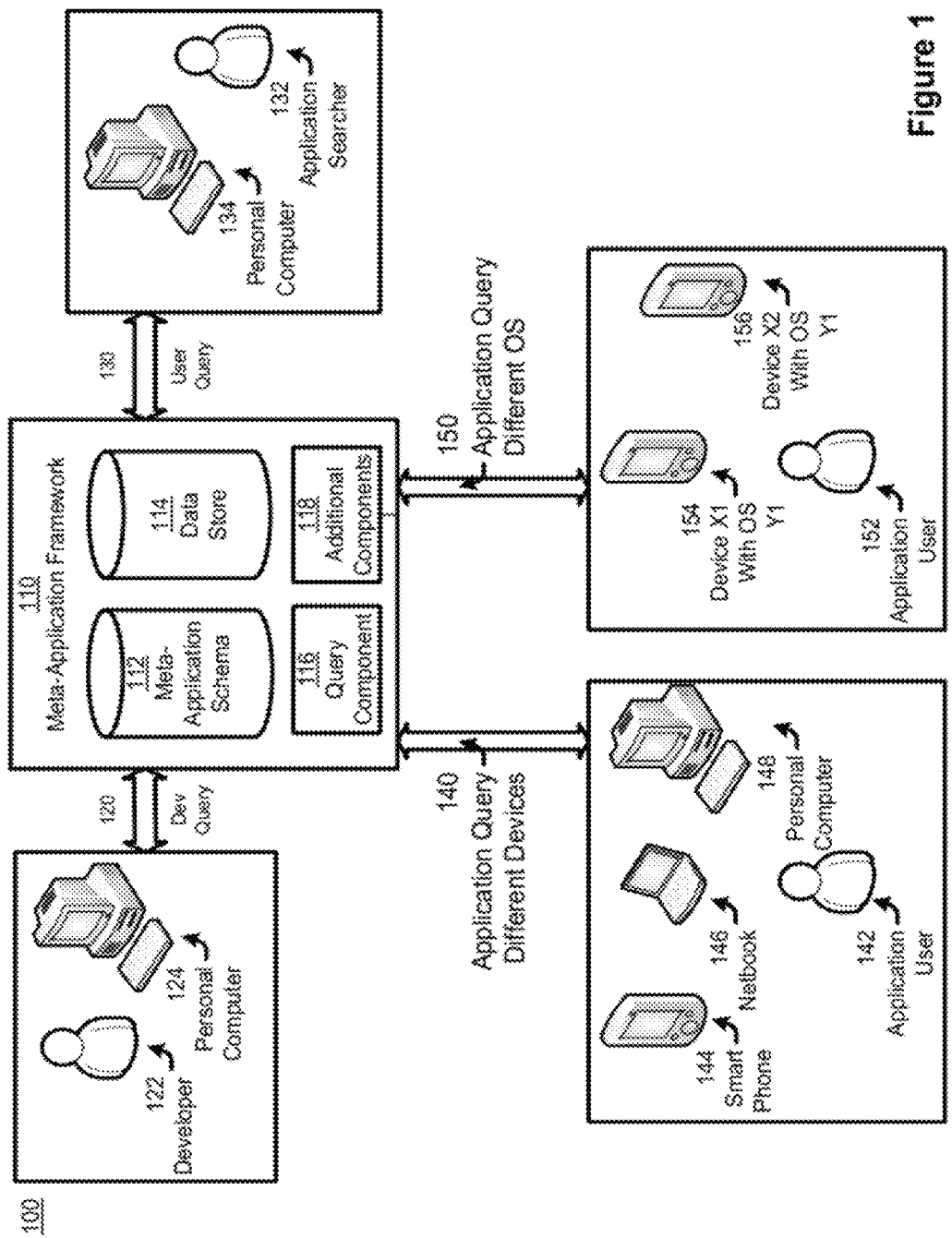
FIG. 1 is a top level operational diagram of an exemplary embodiment of the meta-application framework and its context.

As noted above, a platform is a set of features common across multiple devices and/or multiple operating systems. The term "platform" relates to a set of hardware and software features that collectively may host an application. Accordingly, a platform should associate any feature that would change the user experience or behavior of a hosted application with a device or operating system. In this way, behavioral differences in applications associated with the same platform may be accounted for. Hardware features associated with a device may include hardware peripheral devices such as memory cards and alternative power sources. Software features associated with an operating system may include such as system utilities that to enhance application performance or device drivers.

As used herein, a "meta-application" is a class of applications that have comparable features for some analysis. For example, two different text editors may belong to the same meta-application by virtue of supporting a text editing surface and cursor, cut/copy/paste features, file open/save/close features. A single meta-application may be associated with multiple platforms.

Data about applications and meta-applications may be stored in a meta-application schema which comprises several data entities. The data entities may correspond to meta-applications, applications, platforms, devices and other classes to be tracked by the meta-application framework. Exemplary meta-application schemas will be discussed below.

Whether a feature should be associated with a meta-application or some other entity in the meta-application schema depends on what sort of analysis is to be performed. For example, if a first text editor supports hotkeys specific to a directional pad (D-Pad), and a second text editor supports hotkeys specific to a touch-screen, then the features the two text editors have in common might be associated with the same meta-application entity, but the hotkey features might be associated with the device entity.

Features that cause a change in behavior for an application under different devices, operating systems, or platforms are not associated with meta-applications. Example differences include changes in application performance, such as speed or memory footprint, under different platforms.

One use for a framework supporting meta-applications is in providing applications to platform specific instructions. For example, an application that supported features specific to a directional pad (D-Pad) may refer to a meta-application framework to determine whether to activate those features.

Another use for a framework supporting meta-applications is in providing application stores a structure in which to organize platform specific user feedback. For example, an application may have a better user experience on smart phones that supported a slide-out keyboard than other platforms. Feedback from users with slide-out keyboards could be distinguished from feedback from users without slide-out keyboards. Had the user feedback between the two not been separated, the feedback might have been aggregated together to provide misleading feedback.

Exemplary Environment

FIG. 1 is an operational diagram 100 of an exemplary embodiment of the meta-application framework and its context. Specifically, FIG. 1 illustrates a meta-application framework 110 that supports a number of queries including, but not limited to product planning developer queries 120, user queries 130, queries from applications on different devices 140, and queries from different operating systems, or system software configurations 150.

Meta-application framework 110 comprises a meta-application schema 112 which provides support for meta-applications and for platforms.

Data is stored according to meta-application schema 112 in data store 114. Data store 114 broadly includes any memory that may store computer data, persistently or temporarily. Accordingly, data store 114 may include a hard disk for server implementations, and/or a random access memory (RAM) cache for local, application run-time specific, implementations. Data store may include software to facilitate data operations including, but not limited to a file system and a database. Databases include, but are not limited to relational databases, object databases or n-tuple store databases.

In particular, n-tuple store databases are presently used to store metadata, and are optimized for the storage and retrieval of n-tuples. Properly optimized n-tuple store databases can enable the storage and retrieval of extremely large n-tuple records. For example, Entrez Gene presently stores approximately 172 billion 3-tuples relating to gene sequences. Accordingly n-tuple store databases are suitable for high-volume, high-data applications such as cloud based data stores.

N-tuple stores typically store data records as 3-tuples, or triples. A triple may be comprised of three items: a subject, predicate and object, which show the relationship between the subject and the object. For example, the triple Bob-Works-Microsoft may represent the information the unidirectional relationship that Bob works for Microsoft Corporation. Similarly, the triple: Bob-Married-Sue may represent the bidirectional information that Bob is married to Sue. While there are many formats to store triples and n-tuples, a present standardized format to store triples is a graph store format known as Resource Description Format (RDF) which may represent subject-predicate-object triples.

N-tuple stores need not be 3-tuple stores. A modification to a 3-tuple store, also known as a triplestore, is to add an optional fourth field, making the triplestore a 4-tuple store. The fourth field would be a flag to indicate that a relationship was bi-directional. Thus in the above examples: Bob-Works-Microsoft-False would indicate that Bob works for Microsoft, but Microsoft does not work for Bob; and Bob-Married-Sue-True would indicate that Bob is married to Sue and Sue is married to Bob.

The data in the data store 114 may be accessed according to the meta-application schema 112 via a query component 116. The query component 116 broadly supports data manipulation operations including, but not limited to record creation, retrieval, update and deletion. Queries may include combinations of data manipulation operations, for example as implemented in stored procedures or file operations. The query component 116 may be a standalone application to directly access the data store 114 according to the meta-application schema 112. Alternatively, the query component 116 may expose an application programming interface ("API") to support programmatic access. Accordingly queries may be static or dynamic. Static queries are defined by an unchanging query string. An example of a static query is a query that a user hand enters into a search engine. Dynamic queries may be generated programmatically during run time. An example of a dynamic query is a query dynamically generated by a client application to perform a lookup against the meta-application framework 110.

In the case that the query component 116 supports an API or is otherwise programmatically accessible, additional components 118 may extend the meta-application framework 110 to provide new functionality. An example of an additional component 118 is a behavioral or statistical trend analysis of customer feedback of applications on a meta-application basis. Another example of an additional component 118 is an application specific interface to query the data store 114 seeking platform, device, or operating system specific behavior. In this way, the meta-application framework 110 is operative as a form of lookup or directory service for application attributes.

Application developer queries 120 broadly include any queries relating to product development. Application developer queries may guide future development or alternatively may support running applications. An example of product planning queries is a developer 122 querying the meta-application framework 110 via a PC 124 or other client device, to investigate trends in application feedback. The developer 122 may determine that feedback for an application is more positive for devices with operating system version X rather than operating system version Y, and then may plan features to correct the application's behavior on operating system Y. An example of the meta-application framework 110 providing run time support is a developer 122 enabling an application to perform queries to add attributes and data to be tracked by the meta-application framework 110. These added attributes and data will be later accessed by the application during run time. The retrieved data may be used to dynamically alter the application's behavior during run time.

User queries 130 relate to queries by application end users. For example, a user may be an application searcher 132 searching for applications to purchase in an application store. The application searcher 132 may access the application store via a client device such as PC 134. The application store may have a client application running on the client device 134. Alternatively, the application store may reside on an application server as an intervening web application to be accessed via a web browser. The application store may invoke query component 116 and/or additional components 118, or may itself be comprised of query component 116 and/or additional components 118. In this example, application searcher 132 may be searching for applications specific to his or her platform. The application store may query the meta-application framework 110 to distinguish applications on a per platform, device or operating system basis. By way of another example, after having purchased an application via an application store, the application searcher 132 may wish to provide user feedback on a per platform, device or operating system basis. An example of user feedback is a rating system such as rating an application with three stars out of a five possible stars to indicate average satisfaction with the application. Another example of user feedback is a user entering a text description of which application features are satisfactory as opposed to application features perceived to be deficient. The application store may have a commentary or feedback feature where a user may associate commentary with applications associated with a meta-application. Regardless of the level of implementation detail, the meta-application framework 110 supports associating feedback at the various levels.

Application queries 140 and 150 relate to queries performed by applications during runtime. Application developers 122 may have stored data or logic in the meta-application framework 110 associated with a particular meta-application. In one example, an application user 142 may run an application on different devices including, but not limited to a smart phone 144, netbook 146, and/or PC 148. Alternatively, application user 152 might have two client devices 154 and 156 that are identical but run different versions of the same operating system. Both client devices 154 and 156 run the same application.

In both cases, the application could potentially be the same executable that dynamically enables or disables features based on platform, device or operating system. Such an application could query the meta-application framework 110 via a query component 116 or alternatively access additional components 118 via an API. Alternatively, the application could incorporate query component 116 or additional components 118 locally. The application might be designed in this fashion so that a development company could reduce versions shipped or otherwise consolidate distribution.

Alternatively, the application might download features, or run executables based on platform, device or operating system. For example, an application might have a feature that activated another application, such as a text editor. The application might simply retrieve a pre-positioned variable that specifies to run MyTextEditor.exe if a text editor is to be invoked. Alternatively, the application may dynamically determine which text editor should be invoked by running a query against the meta-application framework 110 to determine the highest ranked text editor for that particular meta-application. The logic to dynamically determine the highest ranked text editor may reside in the client application, or alternatively, may reside in the meta-application framework 110 itself as an additional component 118. By way of another example, the logic to dynamically determine the highest ranked text editor may be stored in a value within the meta-application framework 110. In this case, a developer could distribute patches, updates and other logic to be executed by applications simply by placing it in the meta-application framework 110. Dynamically altering the application's behavior during run time based on the meta-application framework 110 is described in further detail with respect to FIG. 6.

Figure 2:
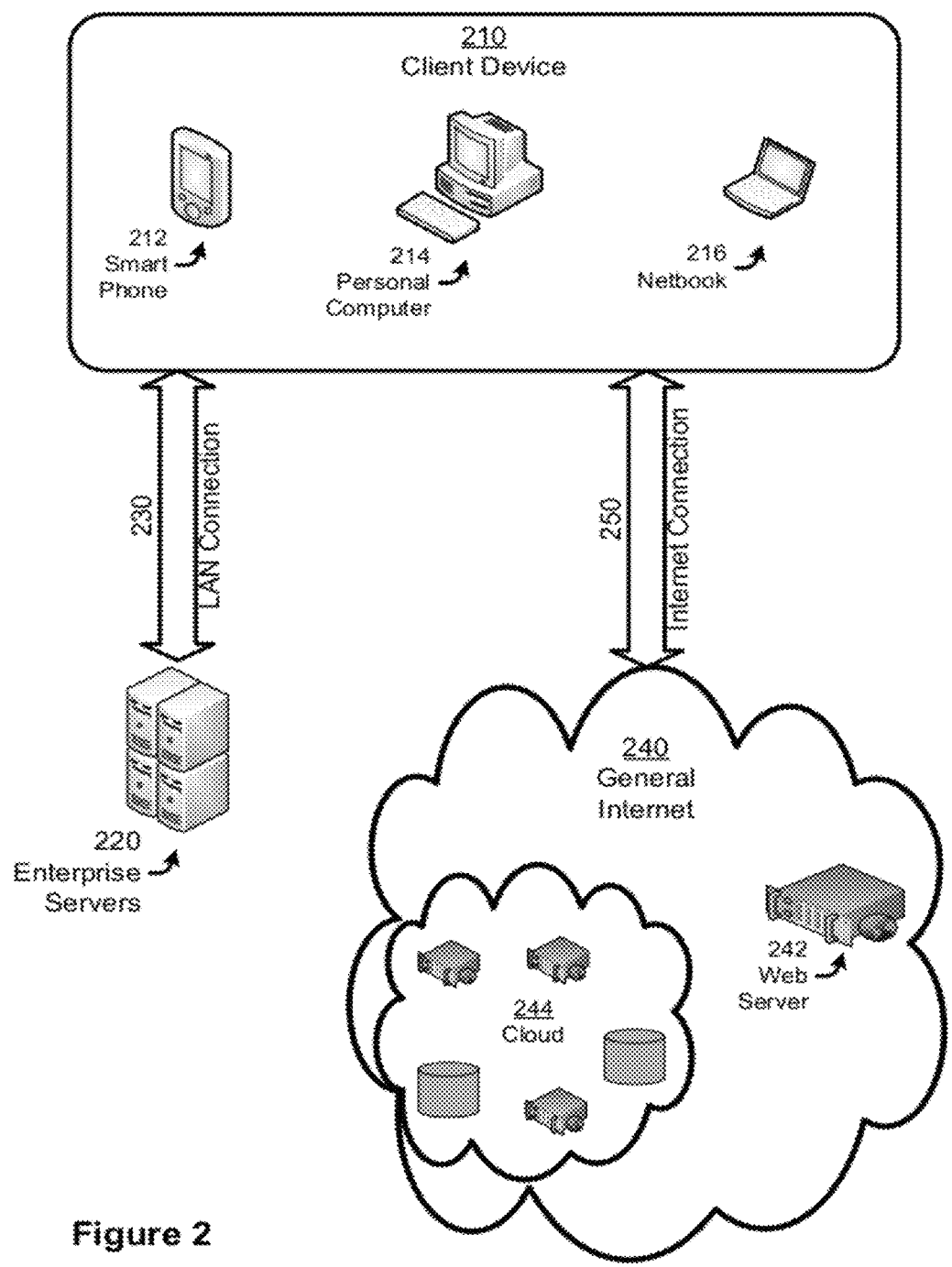
FIG. 2 is an exemplary hardware environment of the meta-application framework and its context.

Exemplary Hardware Architecture for the Meta-Application Framework and its Context FIG. 2 illustrates an exemplary hardware environment 200 for a meta-application framework 110 and its context.

The meta-application framework 110 and applications accessing the meta-application framework 110 are capable of being hosted or invoked from a wide range of client devices 210. Client devices 210 may be any client that runs applications including, but not limited to a smart phone 212, PC 214, or netbook 216. PC 214 may include any device of the standard PC architecture, or may include alternative personal computers such as the Macintosh™ from Apple Computer, or workstations including but not limited to UNIX workstations. Client devices 210 not shown may include notebook PCs, pad computing devices and gaming consoles.

Meta-application aware client applications running on a client device 210 with network capability may then access application servers hosted on an enterprise server 220 or an application server hosted on the general internet 230. In these embodiments, the meta-application framework 110 would be hosted at least in part on the application servers.

If a meta-application framework aware client application is accessing an enterprise server 220 on a local area network ("LAN"), it may connect via any number of LAN connectivity configurations 230. At the physical layer this may include Ethernet or Wi-Fi. At the network/session/transport layer this may include connectivity via the Transmission Control Protocol/Internet Protocol ("TCP/IP") or other protocol. If the client framework for application behavioral services is accessing the internet, it may connect via standard internet protocols including TCP/IP for the network/session/transport layer and Hypertext Transfer Protocol ("HTTP") at the application layer.

Client devices 210 that do not have network capability might host meta-application aware applications and the meta-application framework 110 both on the client device.

Enterprise server 220 may be based on a standard PC architecture, or on a mainframe.

If accessing the general Internet 240, an independently hosted web server 242 may be accessed. A web server 242 may be a standard enterprise server based on a standard PC architecture that hosts an application server. Exemplary application server software includes Internet Information Server ("IIS") from Microsoft Corporation or Apache Web Server, an open source application server. Web server 242 may access a database server also potentially on a standard PC architecture hosting a database. Exemplary databases include, Microsoft SQL Server™ and Oracle. In this way an application behavioral services may run on either 2-tier or 3-tier platforms.

Meta-application aware client applications may access web server 242 or the general internet 240 via cell phone protocols including, but not limited to Cell Division Multiple Access (CDMA), Time Division Multiple Access (TDMA), Frequency Division Multiple Access (FDMA) and their successor protocols.

Alternatively, server infrastructure for meta-application framework 110 may be hosted on a cloud computing service 244. Cloud computing service 244 contains a large number of servers and other computing assets that are potentially in geographically disparate locations. These computing assets may be disaggregated into their constituent central processing units ("CPUs"), memory, long term storage, and other component computing assets. Accordingly, the metadata association process, the search engine, and a digital media object data store, when hosted on cloud computing service 244, would have both centralized and distributed data storage on the cloud, accessible via a data access API such as Open Database Connectivity ("ODBC") or ADO.Net from Microsoft Corporation. At least part of the meta-application framework 110 would be hosted on computing assets in the cloud computing service 244 corresponding to an application server.

Client devices 210, enterprise servers 220 and web servers 242 may all support both on-board and removable computer-readable media. Computer-readable media includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Exemplary Meta-Application Schema

Figure 3:
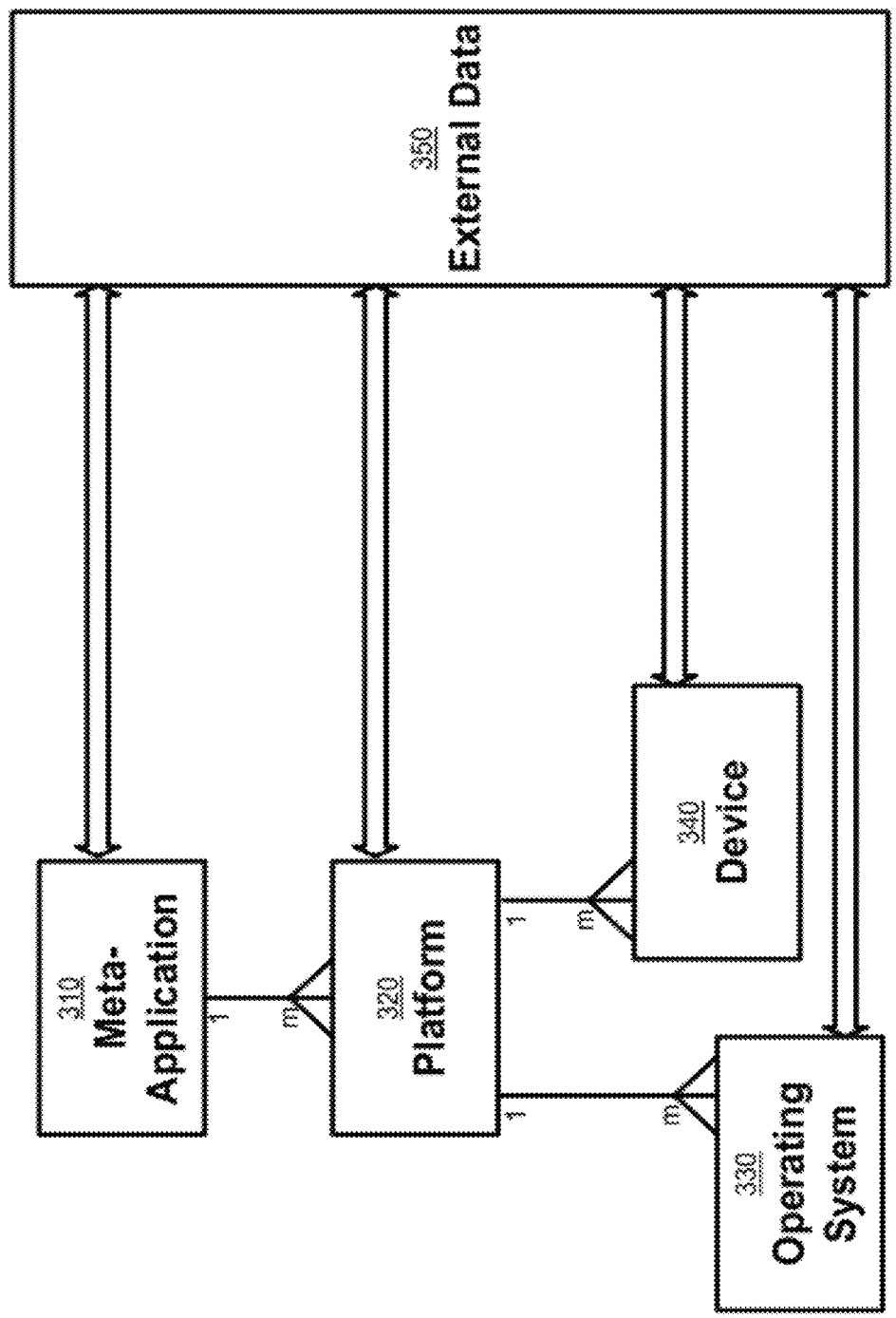
FIG. 3 is an exemplary data schema for the meta-application framework.

FIG. 3 is a schema diagram 300 of an exemplary meta-application schema. Although the schema diagram 300 uses entity-relationship notation, the meta-application schema 112 need not be implemented in a relational database. Rather, the schema diagram 300 is to illustrate structural relationships within the meta-application schema 112 independent of persistence.

Each entity in the meta-application schema 112 including, but not limited to meta-application entity 310, platform entity 320, operating system entity 330, and device entity 340, is associated with one or more attributes. Attributes may be static, semi-static, or dynamic. Static attributes are values that do not change once they are set, such as constants. One example would be an attribute lookup value that pi was 3.1415 . . . . Semi-static attributes are values that rarely change. One example might be the date of last operating system update. Semi-static attribute can potentially have the same value across multiple sessions. Dynamic values are values that may be modified by the user, by the application, remotely by the developer at any time. Dynamic values may change several time during the same session. Regardless of whether attributes are static, semi-static or dynamic, they are populated with external data 350. Populating the meta-application framework is discussed in further detail with respect to FIG. 4 below.

A meta-application entity 310 stores data specific to a meta-application. In the meta-application schema 112, the meta-application entity 310 has attributes specific to the meta-application. For example, a meta-application for text editors might contain a font style attribute. Meta-application attributes may be core attributes which define the base set of functionality available for an application of that meta-application class. Meta-application attributes may also define extended or optional functionality for an application in that meta-application class. Meta-application attributes may also be user defined attributes. Thus the application user could add data specific to his or her user experience.

Platform entity 320 describes features specific to a platform. A meta-application entity 310 is associated with one or more platform entities 320. An example attribute for a platform might be font technology. While all applications in the text editor meta-application support fonts and font styles, some will use TrueType™ as their font technology, associated with a Microsoft Windows™ platform. Others may use Adobe PostScript™ for their font technology, associated for example with an Apple MacIntosh™ platform. Thus in this way, an implementation detail, such as font technology is shifted from the meta-application entity, and into another entity such as platform.

Platform behavior may vary according to operating system or hosting device. Accordingly, the platform entity 320 may be associated with multiple operating system entities 330 and multiple device entities 340. For example, the Microsoft Windows™ platform may include the Win32 API, both of which are supported in Windows Vista™ and Windows 7™ operating systems. Similarly, the Microsoft Windows™ platform would run with some behavioral differences on different devices, such as on a netbook as opposed to on a high performance workstation.

Additional entities may be associated with the platform entity 320 the operating system entity 330 and the device entity 340 without loss of generality.

Accordingly, when external data 350 is used to populate the meta-application schema 112, the data may be organized according to the level of implementation detail, with the meta-application entity 310 defining the features specific to a class of applications, the device entity 340 storing hardware specific details, and the operating system entity 330 storing software specific details. Hardware and software may be grouped into a family of features within the platform entity 320.

Exemplary Process to Populate the Meta-Application Framework

Figure 4:
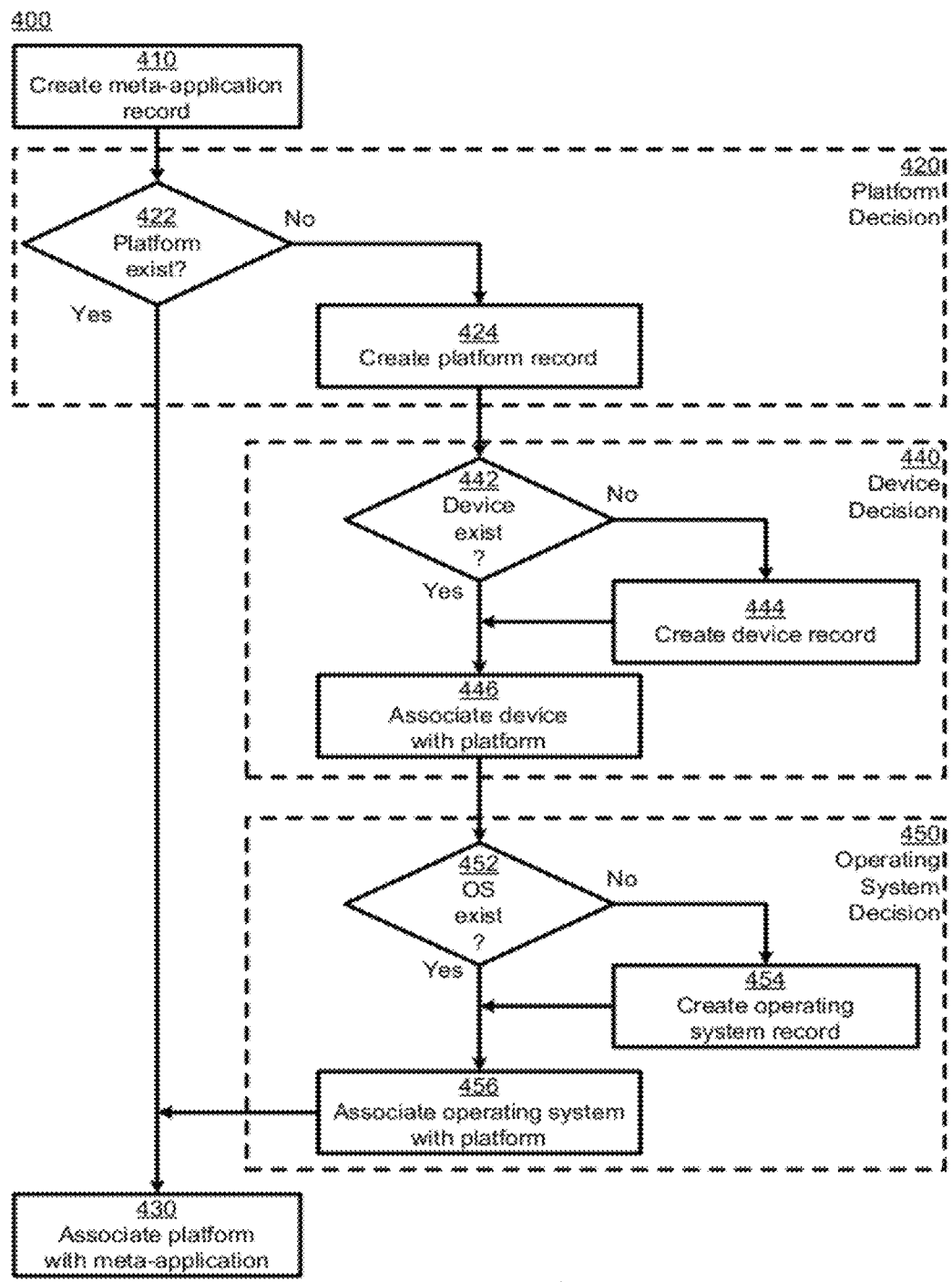
FIG. 4 is a flow diagram of an illustrative process to create a meta-application record in the meta-application framework.

FIG. 4 is a flow chart 400 of an exemplary process to populate the meta-application framework 112. As noted above, the meta-application schema 112 provides a structure for data to be associated with its respective level of implementation detail. Accordingly, when the meta-application framework 112 is populated, by a set of data, that set of data is separated by level of implementation detail, and thereafter associated with the appropriate entity.

By way of example, flow chart 400 illustrates a process to populate the meta-application framework 112 starting from the meta-application entity 310 and progressively moving to implementation specific entities such as the operating system entity 330 and device entity 340. As each entity is populated with a new record, a reference to the new record may be obtained. This reference may be stored as part of a new record stored in the next entity as will be shown below. Other embodiments may work in reverse, where the less abstract entities are populated first through to the more abstract entities using alternative techniques to preserve referential integrity.

The meta-application framework 110 may receive data in the form of data values, and/or new attributes. Data values are values that may be associated with existing attributes and require no change of the meta-application schema 112. When attributes are received, those attributes are then added to the entity thus changing the meta-application schema 112.

When the meta-application framework 110 receives data, at block 410, it may determine if there is a corresponding meta-application record in the meta-application entity 310. If the record exists, new meta-application specific attributes are added as specified and/or meta-application specific attributes are populated with data values. If new meta-application specific data values were added, a reference to those values may also be created.

At block 420, the meta-application framework 110 performs platform entity specific processing. At block 422, the meta-application framework 110 determines if there is platform specific data to be stored. If platform specific data is to be stored, the meta-application framework 110 searches for an associated platform record. If the record does not exist, a new platform record is created at block 424 and platform specific attributes are added as specified and/or platform specific attributes are populated with data values. If the record exists, then the platform record may be populated in the same way, but without reference to a meta-application record. Otherwise, at block 430, the platform record is associated with its corresponding meta-application record, for example by storing the reference to the meta-application record created at block 410 as part of the platform record.

At block 440 the meta-application framework 110 performs device entity specific processing. At block 442, the meta-application framework 110 determines if there is device specific data to be stored. If device specific data is to be stored, meta-application framework 110 searches for an associated device record. If the record does not exist, a new device record is created at block 444 and device specific attributes are added as specified and/or device specific attributes are populated with data values. If the record exists, then the device record may be populated in the same way but without reference to a platform record. Otherwise, at block 446, the device record is associated with its corresponding platform record, for example by storing the reference to the platform record created at block 424 as part of the device record.

At block 450 the meta-application framework 110 performs operating system entity specific processing in an analogous way as block 440 performs for devices. At block 452, the meta-application framework 110 performs a check to see if a corresponding operating system record exists, and if it does not, it creates a new operating system record at block 454. Operating specific attributes are added and/or operating system specific attributes are populated with operating system specific data values. At block 456 a new operating system record may be associated with its corresponding platform record, for example by storing the reference to the platform record created at block 424 as part of the operating system record.

While the device entity 340 and operating system entity 330 are shown as being populated sequentially at blocks 440 and 450, the entities may be populated in reverse order or in parallel, provided a reference to an associated platform record was created at block 424. In this way, the reference may be stored to preserve referential integrity.

The meta-application schema 112 is not necessarily limited to meta-application entity 310, platform entity 320, operating system entity 330 and device entity 340. Additional entities may be populated in an analogous fashion, provided that referential integrity is preserved.

Exemplary Query Process for the Meta-Application Framework

Figure 5:
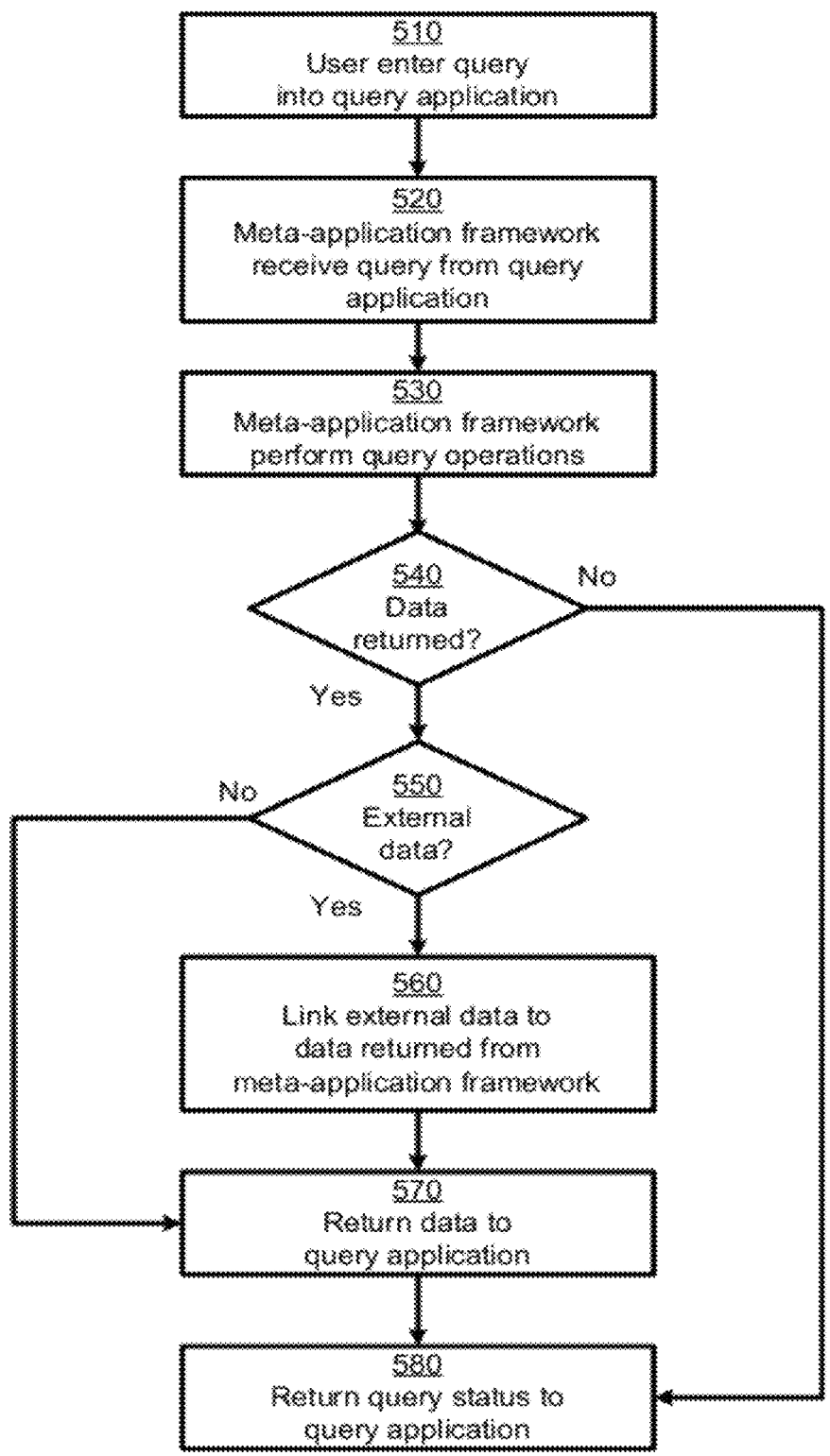
FIG. 5 is a flow diagram of an illustrative process of a direct static query against the meta-application framework.

FIG. 5 is a flow chart 500 of an exemplary query process for the meta-application framework 110. As noted above, meta-application framework 110 supports both static queries and dynamically generated queries.

At block 510, a user may enter a query in a query application, such as an application store or alternatively in an application rating site. The query application may receive user input and translate the query intent into a query string. Alternatively, a sophisticated user, such as a developer may enter a previously prepared static query string. Similarly, if the user is an application, the application may submit a hard-coded query string.

At block 520, the meta-application service 110, receives the query string, via the query component 116.

Upon receipt, at block 530, the query component 116 will parse the query string, perform syntax checking, and perform other query processing. In the event of error, the query component 116 may generate an error message or code to the calling query application.

The meta-application framework 110 supports data definition and data manipulation operations not only with data corresponding to the meta-application schema 112, but also with external data not necessarily stored in the meta-application data store 114. Accordingly at block 540, if the query is a data retrieval query and the meta-application framework 110 is to return data, the meta-application framework 110 also determines at block 550 whether external data is to be returned as well. If external data is to be returned, the external data itself, or references to the external data are retrieved, and at block 560 are associated to meta-application framework data in data store 114. One exemplary technique to link data may be to create a temporary table, and to associate references to the external data, as per a relational join operation. Another exemplary technique would be to dynamically generate attributes in the meta-application schema 112 to store back references to external data. In this way, back references would be persisted and would improve performance for subsequent queries.

After the meta-application framework 110 completes data retrieval per block 540, and any external data are linked per blocks 550 and 560, the data is returned at block 570. If errors occur during this processing, the meta-application framework 110 may generate an error message or code.

At block 580, the meta-application framework 110 returns any error messages or codes generated during processing. Otherwise, the meta-application framework 110 may return a message or code indicating successful processing.

Figure 6:
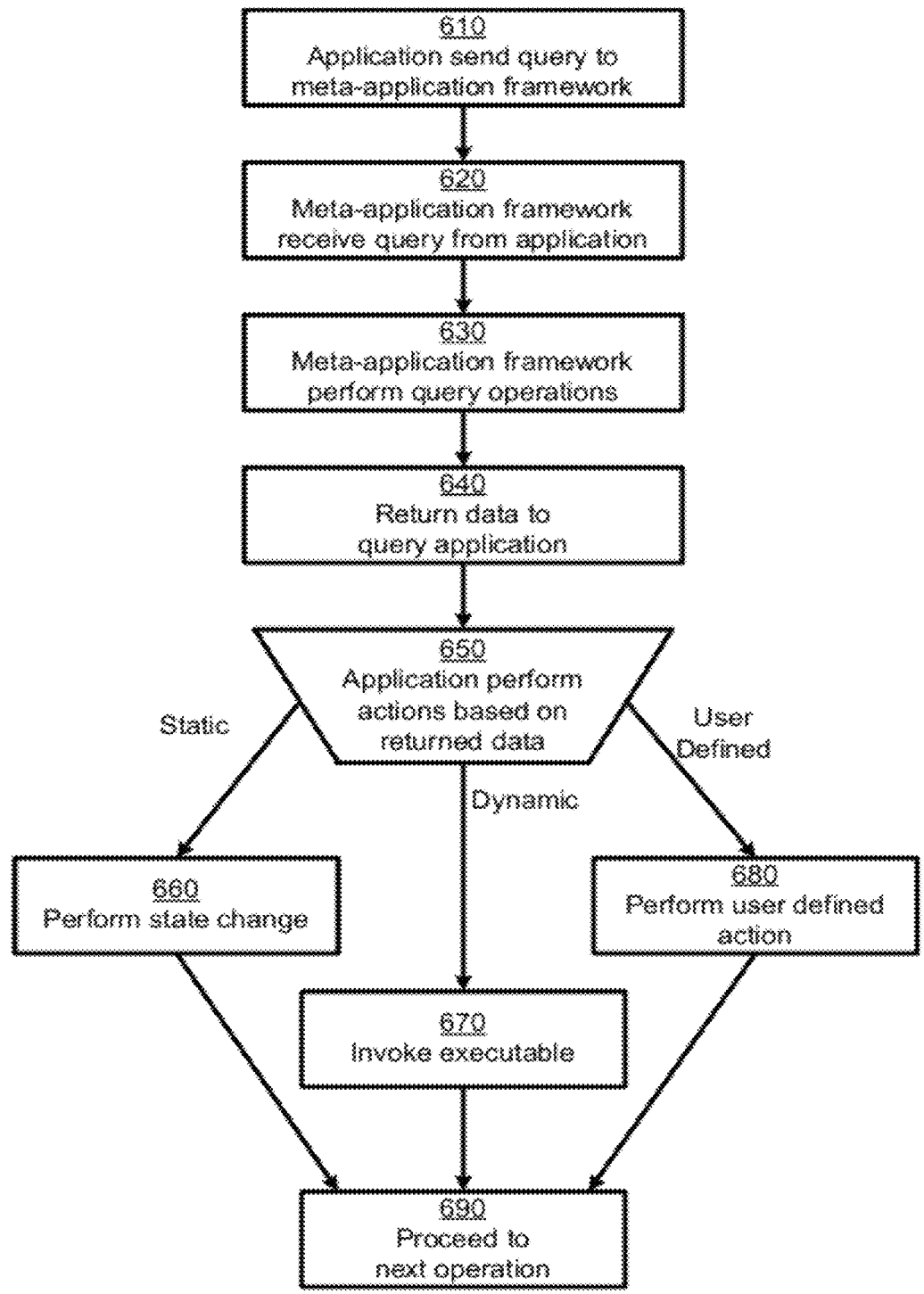
FIG. 6 is a flow diagram of exemplary meta-application framework query processing by an application.

Exemplary Query Process Against the Meta-Application Framework by an Application Query processing by an application may be performed as per the discussion of FIG. 5. However, applications may furthermore modify their behavior based on the returned data results. FIG. 6 is a flow chart 600 of an exemplary query process against the meta-application framework 112 by an application. Specifically, flow chart 600 illustrates the particular case where an application retrieves data and changes behavior based on the retrieved data. FIG. 6 does not preclude other cases where an application may perform queries that do not retrieve data, or where an application merely retrieves data without changing behavior.

At block 610, an application generates a query and sends the query to the meta-application framework 110. The application may simply forward a static string, or may dynamically generate the query during run time.

At block 620, the meta-application framework receives the query and performs query operations at block 630. Processing may proceed as at block 530 of FIG. 5. Because an application may invoke query component 116 via an API, an application might alternatively bypass query parsing and may perform data operations directly.

At block 640, the meta-application framework 110 returns data corresponding to the query. In the present example, since the application is making a determination on how to change behavior based on information in the meta-application framework 110, the query is always a retrieval request. At block 650, the meta-application framework performs actions based on the returned data.

If the returned data is a static directive, the application may perform a state change 660 in response. State changes include, but are not limited to, application behavioral changes, user interface changes, and performance changes. For example, an application may determine that for devices with direction pads ("D-Pads"), it should enable a particular D-Pad specific feature. Alternatively, an application may determine that for operating systems below a certain version number that certain features should be turned off for lack of operating system support.

If the returned data is a dynamic directive, the application may be directed to invoke another application at block 670. For example, an application that integrates with a text editor may query the meta-application framework 110 to determine which text editor to invoke. The meta-application framework 110 may determine that a new text editor released a few days ago is considered better than the text editor the user was previously using, and accordingly may execute the new text editor.

The return data may also provide user defined logic to be executed at block 680. For example, the returned data may be in the form of a script that may be executed within the application. Alternatively, the returned data may be in the form of a script that may be executed by a script interpreter on the client device, executing independently of the application.

At block 690, any error messages or codes generated during processing returned by the meta-application framework 110.

While FIG. 6 illustrates application behavior at blocks 650, 660, 670 and 680 as being performed sequentially, other embodiments may process multiple requests concurrently and may perform these blocks in parallel.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   a processor;
   a storage communicatively coupled to the processor;
   a schema stored in the storage, the schema comprising:
      a first set of data fields for a meta-application that includes a class of applications, wherein an individual application in the class of applications is distinct from other applications in the class of applications and the individual application is configured to support same functionality as the other applications, the first set of data fields describing one or more first features capable of being implemented on various devices by each application in the class of applications independent of a type of operating system and independent of device hardware;
      a second set of data fields for the meta-application, the second set of data fields describing one or more second features capable of being implemented by the individual application in the class of applications based on a specific type of operating system; and a third set of data fields for the meta-application, the third set of data fields describing one or more third features capable of being implemented by the individual application in the class of applications based on specific device hardware; and a query component executable on the processor and operative to:
store data in the storage according to the schema;
receive, from a client device, a query request;
determine, based at least in part on the received query request, that the client device comprises at least one of the specific type of operating system or the specific device hardware;
perform a query on at least part of the stored data according to the schema, the query to determine that the individual application is capable of implementing at least one second feature or at least one third feature while the individual application is executing on the client device based at least in part on the determination that the client device comprises the at least one of the specific type of operating system or the specific device hardware; and
enable the at least one second feature or the at least one third feature of the individual application on the client device.

2. The computing device of claim 1, wherein the first set of data fields comprises:
a set of core data fields, the core data fields describing minimal functionality supported by each application in the class of applications; and
a set of user customizable fields.

3. The computing device of claim 1, wherein at least one data field in the schema is to enable the individual application to invoke application logic in a second application.

4. The computing device of claim 1, wherein the schema is stored in the storage via at least one of a relational database format or a graph store format.

5. The computing device of claim 1, wherein the query component is accessible via a web service.

6. The computing device of claim 5, wherein the computing device is hosted in a cloud-computing data center.

7. The computing device of claim 1, wherein the query component exposes its functionality through an application programming interface (API) to enable dynamic invocation of the query component by an executable.

8. The computing device of claim 1, the computing device further comprising at least one of:
an access control component executable on the processor, operative to block access to the stored data based on privileges associated with the received query request, or
a payment component executable on the processor, operative to receive payment information, and to block access to the stored data based on the received payment information.

9. A method of retrieving data from a meta-application service, the method comprising:
configuring a schema for the meta-application service, the schema including:
a first set of data fields for a meta-application that includes a class of applications, wherein an individual application in the class of applications is distinct from other applications in the class of applications and the individual application is configured to support same functionality as the other applications, the first set of data fields describing one or more first features capable of being implemented on various devices by each application in the class of applications independent of a type of operating system and independent of device hardware;
a second set of data fields for the meta-application, the second set of data fields describing one or more second features capable of being implemented by the individual application in the class of applications based on a specific type of operating system; and
a third set of data fields for the meta-application, the third set of data fields describing one or more third features capable of being implemented by the individual application in the class of applications based on specific device hardware;
receiving, from a device, a data retrieval request for the meta-application service, the data retrieval request including one or more hardware features of the device;
performing a query on the schema using the one or more hardware features of the device, the query to determine that the device is capable of implementing at least one second feature or at least one third feature while executing the individual application based at least in part on a determination that the device comprises the at least one of the specific type of operating system or the specific device hardware; and
providing, to the device, information instructing the device to invoke the individual application in the class of applications based at least in part on the determination that the device comprises the at least one of the specific type of operating system or the specific device hardware.

10. The method of claim 9, wherein the data retrieval request is a dynamic request received during runtime of another application.

11. The method of claim 9, wherein the individual application comprises a highest ranked application among the class of applications.

12. The method of claim 10, wherein the class of applications is associated with text editing and the individual application comprises a text editor application that integrates with the other application during the runtime of the other application.

13. The computing device of claim 1, wherein the one or more third features include a user interface feature of the application implementable on the client device based at least in part on a type of input device.

14. A method comprising:
configuring a schema for a meta-application service, the schema including:
a first set of data fields for a meta-application that includes a class of applications, wherein an individual application in the class of applications is distinct from other applications in the class of applications and the individual application is configured to support same functionality as the other applications, the first set of data fields describing one or more first features capable of being implemented on various devices by each application in the class of applications independent of a type of operating system and independent of device hardware;
a second set of data fields for the meta-application, the second set of data fields describing one or more second features capable of being implemented by the individual application in the class of applications based on a specific type of operating system; and
a third set of data fields for the meta-application, the third set of data fields describing one or more third features capable of being implemented by the individual application in the class of applications based on specific device hardware;

receiving, at the meta-application service, a data retrieval request generated by an application, the data retrieval request including one or more hardware features of a device executing the application;

determining, via performance of a query on the schema and based at least in part on the one or more hardware features of the device, that a particular application in the class of applications is to be invoked by the application executing on the device; and providing, to the device, instructions for the application to invoke the particular application.

15. The method of claim 14, further comprising accessing a ranking of the class of applications to determine that the particular application is to be invoked by the application, wherein the particular application comprises a highest ranked application among the class of applications.

16. The method of claim 15, wherein the ranking is based at least in part on user feedback associated with the class of applications.

17. The method of claim 14, wherein the particular application comprises a text editor application that integrates with the application during runtime of the application.

18. The method of claim 14, wherein data fields of the schema describe behavior of the particular application in association with the one or more hardware features of the device.

19. The computing device of claim 1, wherein the individual application comprises a highest ranked application among the class of applications.

20. The computing device of claim 1, wherein the class of applications is associated with text editing and the individual application comprises a text editor application.

* * * * *